Patented May 14, 1929.

1,713,347

UNITED STATES PATENT OFFICE.

JACQUE C. MORRELL, OF OAK PARK, ILLINOIS.

METHOD OF ACTIVATING CARBON.

No Drawing.  Application filed May 19, 1923. Serial No. 640,229.

This invention relates to a method of activating carbon and has special reference to a process of activating charcoals to increase their adsorptive properties.

Carbon and adsorbent charcoals of various kinds have heretofore been treated with various oxidizing agents, such as air, steam, $CO_2$, chlorine gas, etc., at high temperatures in order to increase their efficiency and adsorptive powers.

In my copending application, Ser. No. 284,459, which has matured into U. S. Patent No. 1,478,985, activation of charcoal or carbon has been defined as an increase in the adsorption efficiency of the materials, and the following are some of the methods which are given for accomplishing this result:

(a) Repeated heat treatments.
(b) Steam treatment.
(c) Heating in the presence of mild oxidizing agents.

I have also stated in this copending application that the process of activation is probably:

(a) An opening up of the closed pores into ducts (continuous pores) by fracturing the walls.
(b) Removal of tenaceous hydrocarbons and compounds other than carbon by decomposition, cracking and volatilization.
(c) Changing hard graphitoidal or "coke like carbon" (which is essentially inactive carbon), to the soft, dull, velvety or non-graphitoidal variety.
(d) Removal of secondary carbon obstructions from the ducts.
(e) Forming or creating new ducts in the carbon, and thus increasing adsorption surface.

The object of this invention is to accomplish one or more of these results with the ultimate design of increasing the adsorption efficiency of the treated charcoal or carbon; that is, the activation of the finished product or the raw material used for making artificial or synthetic charcoal or for other purposes disclosed in the copending application. The treatment of raw carbonaceous material of a coke or graphitoidal nature by my new process converts it into the dull, velvety, black variety.

In my new process I employ a solution of a halogen, such as an aqueous solution of chlorine. The reaction of such a solution may be represented by the following equation:

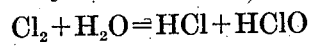

$$Cl_2 + H_2O = HCl + HClO$$

An excess of molecular chlorine is present. The HClO which is formed is a very good oxidizing agent and decomposes with considerable energy, thereby assisting the reaction.

I prefer to have the raw carbon material in a finely divided condition or in a granular state while it is undergoing the activation, as this promotes the activating reactions.

A specific example of carrying out my invention is as follows: The carbon or charcoal is introduced into a concentrated solution of chlorine, preferably a saturated aqueous solution, and the strength of the chlorine in the solution is maintained by introducing the chlorine from time to time until absorption is complete. The mass is allowed to stand until the desired reaction and activation have occurred. It is often desirable to have the charcoal at a slightly elevated temperature when being introduced into the solution, and the charcoal may be taken direct from the furnace and brought into immediate contact with the solution of chlorine.

My new process of activation may be employed to supplement or assist the activation by heat treatments, and may precede or follow such heat-treatment activation. If it is desired to use my new activation process in connection with steam activation, the carbon or charcoal after activation by the solution of chlorine is dried and then steam activated according to the process described in my copending application.

In practicing my invention, other halogens, for example bromine, may be employed in place of chlorine, but I prefer to use the latter for economic reasons and because it operates very satisfactorily. A mixture of halogens may also be employed instead of a single halogen, and I have found that in some cases the addition of a small amount of bromine to the chlorine solution helps to start the reaction. Other solvents for the halogen may be employed, but I also prefer to use water because it is inexpensive and very satisfactory.

Instead of preparing a solution of a halogen from the elemental halogen and solvent therefor, I may employ the halogen electrolytically generated in situ for my activation.

A specific example of carrying out this modfication of my new process is as follows: An aqueous solution of HCl, NaCl, etc., is placed in a vessel, which may serve as the anode, and the carbon or charcoal to be activated distributed along the bottom and sides of the vessel. Any suitable form of cathode may be employed, for example graphite or carbon electrodes, and in order to increase the capacity of this system a rack of such anodes may be suspended to project into the solution. By applying the electric current the chlorine liberated at the anode acts upon the carbon or graphite to activate same.

By the term "carbon having a highly porous structure", as employed in the claims is meant pure carbon or a mixture of natural or artificial origin which contains a high percentage of carbon, is penetratable and porous and includes the various charcoals and carbons of animal, vegetable or mineral origin. This carbon is distinguishable from the dense, compact graphite of close texture.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of activating carbon, subjecting particles of carbon having a highly porous structure to the action of a solution of a halogen in water.

2. In a process of activating carbon, subjecting particles of carbon having a highly porous structure to the action of an aqueous solution of chlorine.

3. In a process of activating carbon, subjecting particles of carbon having a highly porous structure to the action of a concentrated aqueous solution of a halogen.

4. In a process of actuating carbon, subjecting particles of carbon having a highly porous structure to the action of a concentrated aqueous solution of chlorine.

In testimony whereof I affix my signature.

JACQUE C. MORRELL.